(12) United States Patent
Rajakumar

(10) Patent No.: US 8,073,691 B2
(45) Date of Patent: Dec. 6, 2011

(54) METHOD AND SYSTEM FOR SCREENING USING VOICE DATA AND METADATA

(75) Inventor: Anthony Rajakumar, Menlo Park, CA (US)

(73) Assignee: Victrio, Inc., Menlo Park, CA (US)

( * ) Notice: Subject to any disclaimer, the term of this patent is extended or adjusted under 35 U.S.C. 154(b) by 1068 days.

(21) Appl. No.: 11/754,974

(22) Filed: May 29, 2007

(65) Prior Publication Data

US 2007/0282605 A1 Dec. 6, 2007

Related U.S. Application Data

(63) Continuation-in-part of application No. 11/404,342, filed on Apr. 14, 2006, now abandoned.

(60) Provisional application No. 60/808,892, filed on May 30, 2006, provisional application No. 60/923,195, filed on Apr. 13, 2007, provisional application No. 60/673,472, filed on Apr. 21, 2005.

(51) Int. Cl.
*G10L 17/00* (2006.01)
*G10L 11/00* (2006.01)
*G06Q 99/00* (2006.01)

(52) U.S. Cl. ............... 704/246; 704/270; 705/318

(58) Field of Classification Search ............ None
See application file for complete search history.

(56) References Cited

U.S. PATENT DOCUMENTS

| | | | |
|---|---|---|---|
| 5,999,525 A | 12/1999 | Krishnaswamy | |
| 6,044,382 A | 3/2000 | Martino | |
| 6,427,137 B2 * | 7/2002 | Petrushin | 704/273 |
| 7,212,613 B2 | 5/2007 | Kim et al. | |
| 7,386,105 B2 * | 6/2008 | Wasserblat et al. | 379/114.14 |
| 7,657,431 B2 * | 2/2010 | Hayakawa | 704/246 |
| 7,908,645 B2 | 3/2011 | Varghese | |
| 2001/0026632 A1 | 10/2001 | Tamai | |
| 2002/0099649 A1 | 7/2002 | Lee et al. | |
| 2004/0029087 A1 | 2/2004 | White | |
| 2004/0131160 A1 | 7/2004 | Mardirossian | |
| 2004/0240631 A1 | 12/2004 | Broman et al. | |
| 2005/0125339 A1 | 6/2005 | Tidwell et al. | |
| 2005/0185779 A1 * | 8/2005 | Toms | 379/114.14 |
| 2006/0106605 A1 * | 5/2006 | Saunders et al. | 704/246 |
| 2006/0161435 A1 * | 7/2006 | Atef et al. | 704/246 |
| 2006/0212407 A1 | 9/2006 | Lyon | |
| 2006/0248019 A1 | 11/2006 | Rajakumar | |
| 2006/0282660 A1 | 12/2006 | Varghese et al. | |
| 2006/0293891 A1 * | 12/2006 | Pathuel | 704/246 |
| 2007/0041517 A1 | 2/2007 | Clarke et al. | |
| 2007/0074021 A1 | 3/2007 | Smithies et al. | |
| 2007/0280436 A1 | 12/2007 | Rajakumar | |
| 2008/0010066 A1 * | 1/2008 | Broman et al. | 704/246 |

(Continued)

FOREIGN PATENT DOCUMENTS

EP 598469 A2 5/1994

*Primary Examiner* — Brian Albertalli
(74) *Attorney, Agent, or Firm* — Carr & Ferrell LLP

(57) ABSTRACT

In one embodiment, the invention provides a method, comprising: (a) maintaining a database of known fraudsters, wherein each fraudster has a voice signature and metadata associated therewith; (b) performing a screening operation to match a candidate with a fraudster in the database based on matching a voice signature and metadata for the candidate with a voice signature and metadata for the fraudster in the database.

14 Claims, 10 Drawing Sheets

U.S. PATENT DOCUMENTS

| | | |
|---|---|---|
| 2009/0046841 A1* | 2/2009 | Hodge .................... 379/189 |
| 2009/0119106 A1 | 5/2009 | Rajakumar et al. |
| 2009/0147939 A1* | 6/2009 | Morganstein et al. ... 379/207.13 |
| 2009/0254971 A1 | 10/2009 | Herz et al. |
| 2010/0228656 A1 | 9/2010 | Wasserblat et al. |
| 2010/0303211 A1 | 12/2010 | Hartig |
| 2010/0305946 A1 | 12/2010 | Gutierrez |
| 2010/0305960 A1 | 12/2010 | Gutierrez |

* cited by examiner

METHOD AND SYSTEM FOR SCREENING USING VOICE DATA AND METADATA

RELATED APPLICATIONS

This application is a continuation-in-part of U.S. patent application Ser. No. 11/404,342 filed on Apr. 14, 2006, now abandoned and entitled "METHOD AND SYSTEM TO DETECT FRAUD USING VOICE DATA," which in turn claims priority benefit to U.S. provisional patent application Ser. No. 60/673,472, filed Apr. 21, 2005. This application claims the benefit of priority to U.S. 60/808,892 filed May 30, 2006, and to U.S. 60/923,195 filed Apr. 13, 2007.

FIELD

Embodiments of the invention relate to a method and system to detect fraud such as credit card fraud.

BACKGROUND

Modern merchants are susceptible to many forms of fraud, but one form that is particularly pernicious is credit card fraud. With credit card fraud, a fraudster fraudulently uses a credit card or credit card number of another to enter into a transaction for goods or services with a merchant. The merchant provides the goods or services, but since the transaction is with the fraudster the merchant runs the risk of not getting paid. Another form of fraud that is very difficult for merchants particularly large merchants, to detect, if at all, occurs in the job application process where an applicant has been designated as undesirable in the past—perhaps as a result of having been fired from the employ of the merchant at one location or for failing a criminal background check—fraudulently assumes a different identity and then applies for a job with the same merchant at a different location. In such cases, failure to detect the fraud could result in the rehiring of the fraudster to the detriment of the merchant. If the fraudster has assumed a new identity, background checks based on identity factors such as names or social security numbers become essentially useless. For example consider that case of a large chain store, such as, for example, Walmart. In this case, an employee can be terminated for say theft at one location, but then rehired under a different identity at another location. The employee represents a grave security risk to the company particularly since the employee, being familiar with the company's systems and internal procedures will be able to engage in further conduct injurious to the company.

SUMMARY

In one embodiment, the invention provides a method, comprising (a) maintaining a database of known fraudsters, wherein each fraudster has a voice signature and metadata associated therewith; (b) performing a screening operation to match a candidate with a fraudster in the database based on matching a voice signature and metadata for the candidate with a voice signature and metadata for the fraudster in the database.

Other aspects of the invention will be apparent from the detailed description below.

BRIEF DESCRIPTION OF THE DRAWINGS

Embodiments of the invention will now be described, by way of example, with reference to the accompanying diagrammatic drawings, in which.

DETAILED DESCRIPTION

In the following description, for purposes of explanation, numerous specific details are set forth in order to provide a thorough understanding of the invention. It will be apparent, however, to one skilled in the art, that the invention may be practiced without these specific details. In other instances, structures and devices are shown at block diagram form only in order to avoid obscuring the invention.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Broadly, embodiments of the present invention at least reduce losses due to fraudulent transactions, such as for example, credit card transactions by using voice data to identify fraudsters.

Figure 1:
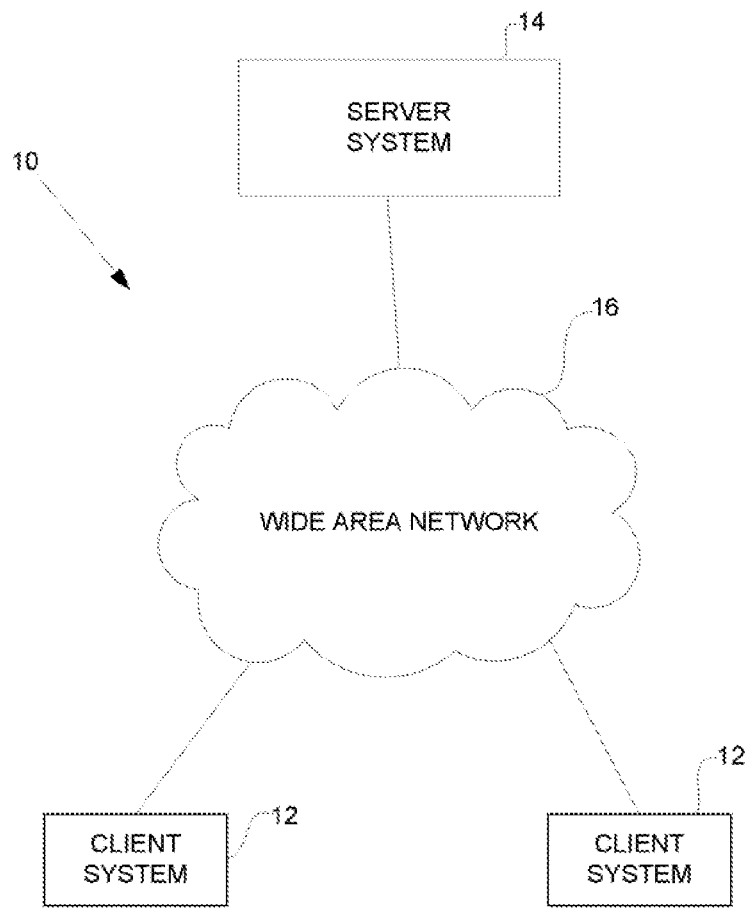
FIG. 1 shows a system within which embodiments of the invention may be practiced.

Embodiments of the invention will be described with reference to FIG. 1 of the drawings, which shows a system 10 in accordance with one embodiment of the invention. As will be seen, the system 10 includes a client system 12 which is coupled to a server system 14 via an intermediate Wide Area Network (WAN) 16, which may for example comprise the Internet.

Figure 2:
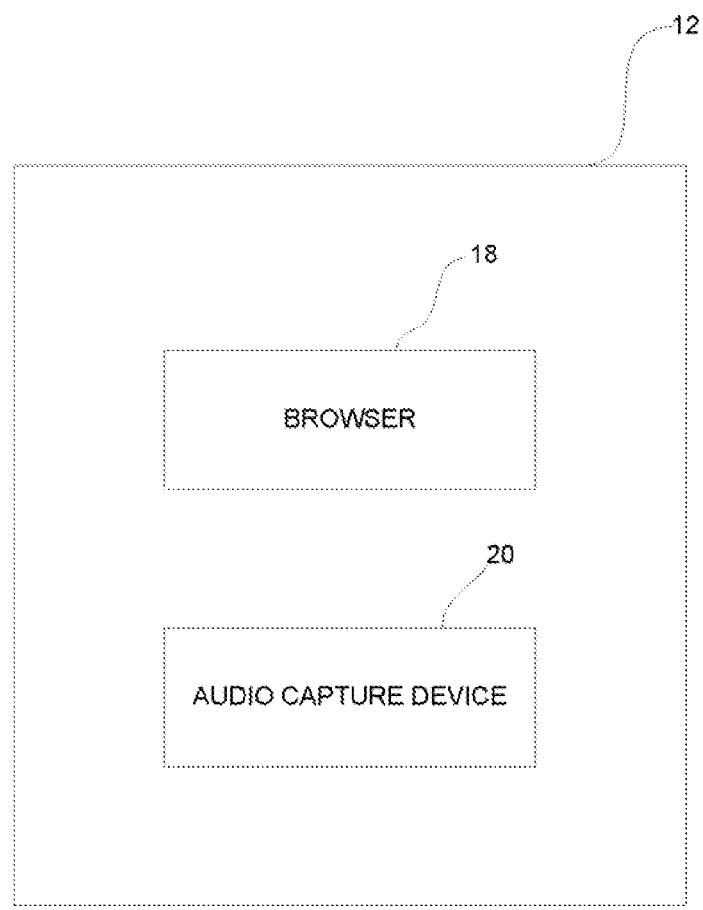
FIG. 2 shows a client system in accordance with one embodiment of the invention.

In accordance with embodiments of the invention, the client system 12 may be located on client premises, for example the premises of a merchant. In one embodiment the client system 12 may be a distributed system that includes components that are not all located at a single location, but instead are distributed over multiple locations. As will be seen from FIG. 2 of the drawings, the client system 12 may include software to facilitate communications with the server system 14. In one embodiment the software may include a browser 18 which is an application that facilitates communications via the Wide Area Network (WAN) 16 with the server system 14 using networking protocols such as for example the Hypertext Transfer Protocol (HTTP)/the Internet Protocol (IP) the Simple Object Access Protocol (SOAP), etc. The client system 12 may also include audio capture device 20 may include any device capable of capturing audio such, as for example, a microphone, a telephone, etc. In one embodiment, the audio capture device 20 may be configured to transmit audio to the server system 14 via a secure connection establish using the network 16. An example of such a secure connection may include a Virtual Private Network (VPN) over the public Internet.

Figure 3:
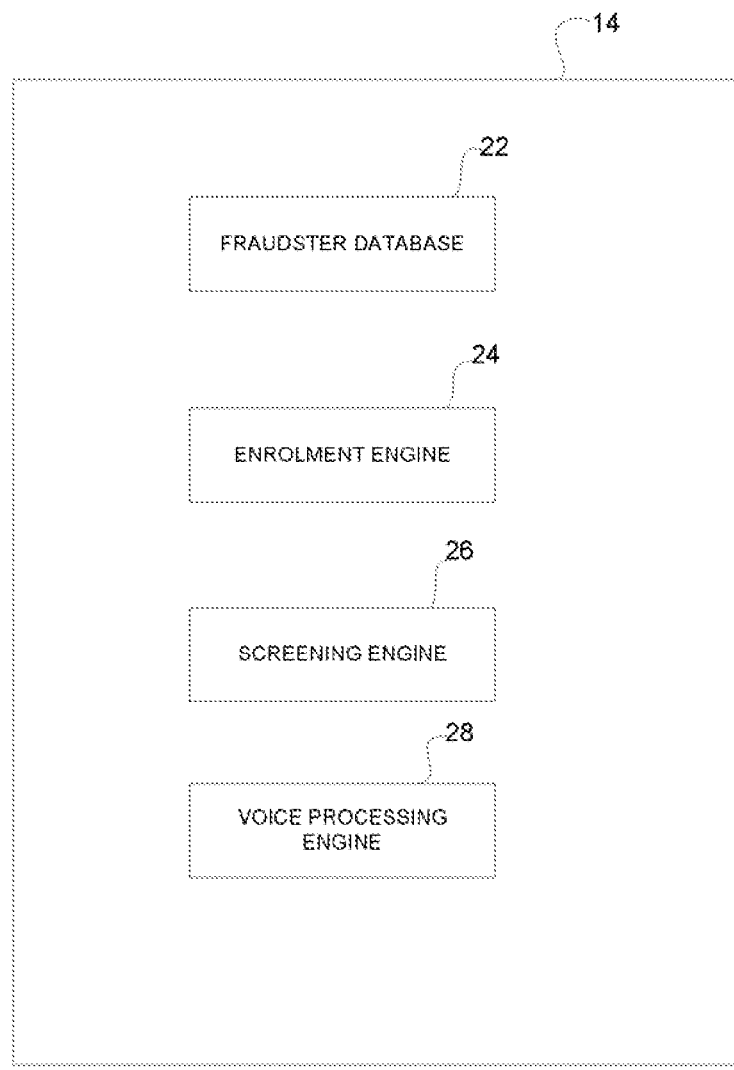
FIG. 3 shows a server system in accordance with one embodiment of the invention.

FIG. 3 of the drawings shows a high level block diagram of the server system 14, in accordance with one embodiment of the invention. As will be seen, the server system 14 includes a fraudster database 22, an enrolment engine 24, a screening engine 26, and a voice processing engine 28. Each of the components 22 to 28 may be implemented in hardware or in software or as a combination of both hardware and software. Further, it is to be understood that while the components 22-28 are shown as separate components based on function, in reality some or all the components may be integrated.

The fraudster database 22 includes voice signatures or voice prints of known fraudsters. Essentially, a voice signature or print includes a set of voice characteristics that uniquely identify a person's voice. In one embodiment, each voice signature in the fraudster database 22 is assigned a unique identifier (ID), which in accordance with one embodiment may include a social security number for the fraudster, or a credit card number linked to the fraudster, as will be described later. Briefly, the enrolment engine 24 performs operations necessary to enroll voice signatures of known fraudsters into the fraudster database 22. The screening engine 26 receives requests from the client system 12 to screen a potential fraudster. In response to such requests, the screening engine 26 performs a screening operation and returns a result of the screening operation to the client system 12. In one embodiment, the voice processing engine 28 implements voice processing algorithms that are used by the enrolment engine 24, and the screening engine 26 in the performance of their respective functions, as will be described below.

Figure 4:
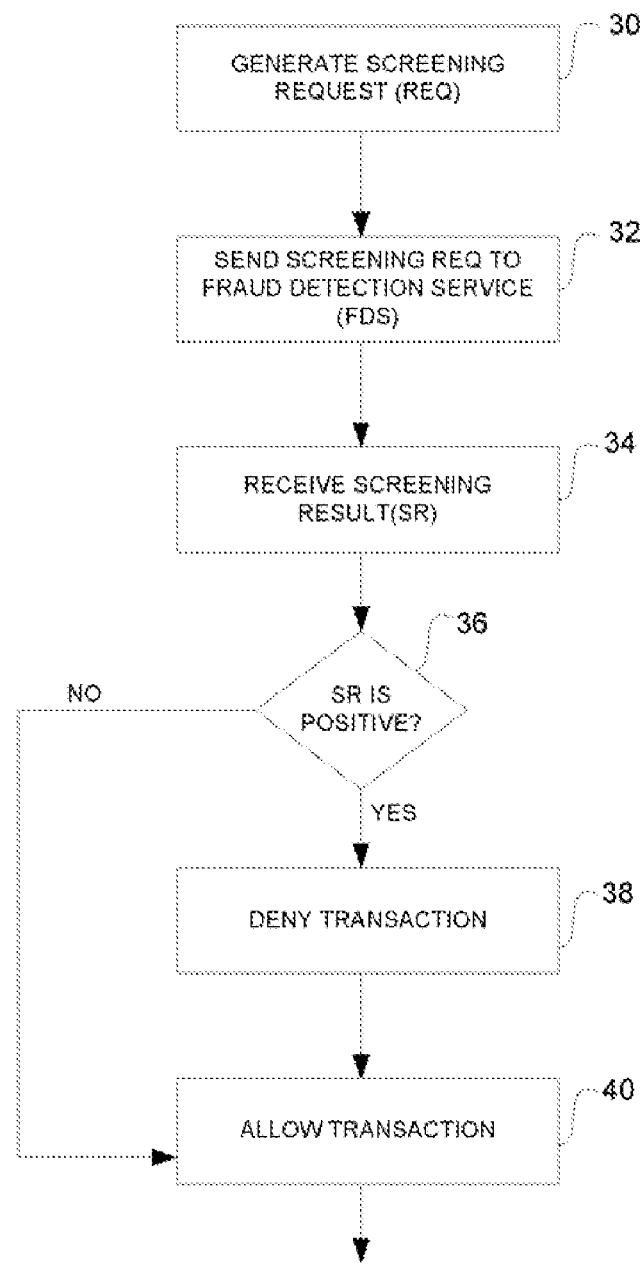
FIG. 4 shows a flowchart of operations performed by the client system of FIG. 2, in accordance with one embodiment of the invention.

Turning now to FIG. 4 of the drawings, there is shown a flowchart of operations performed by the client system 12, in accordance with one embodiment of the invention. Starting at block 30, the client system generates a screening request (REQ). According to the nomenclature used herein the "client system" is also referred to as "the screening entity". The screening request (REQ) is to screen a potential fraudster. For example, the client system 12 may be installed on the premises of a retail merchant who may be either a traditional retail merchant with brick and mortar facilities, or an online retail merchant. The retail merchant may be processing a credit card transaction and the screening request generated at 30 is to screen, for example, a purchaser who initiated the credit card transaction so that the credit card transaction may be denied if it turns out that the purchaser is a fraudster. It is to be noted that use of the client system 12 to detect credit card fraud is intended only to be illustrative of how embodiments of the present invention may be used to detect fraud based on voice data. To further the reader's understanding of how embodiments of the present invention may be used to detect fraud, in a second example, the client system 12 may be that of a large nationwide retailer, for example Walmart. In this case, instead of using the client system 12 to detect credit card fraud, the retailer may use the client system 12 as part of a screening process to verify the identity of, say, a job applicant. With regard to the second application, the reader is requested to bear in mind the risks, described in the background section of this application, associated with a retailer in the event of not being able to successfully verify the identity of a job applicant.

Continuing with FIG. 4 of the drawings, at block 32 the client system 12 sends the screening request to the server system 14 which in effect implements a fraud detection service (FDS). At block 34, a result of the screening is received from the server system 14 at block 36, the client system 12 determines if the screening result is positive as will be the case if the job applicant, or the purchaser is a fraudster, in which case at block 38, the transaction (for example a purchasing transaction, or job application) is denied. If at block 36 it is determined that the screening result is negative then control passes to block 40, where the transaction is allowed. Thus, in broad terms, the techniques and systems disclosed herein may be used to disqualify candidates from further participation in a transaction such as a credit card transaction or a job application. In accordance with different embodiments of the invention there may be differences in how a transaction is processed. In some cases the merchant may charge a credit or debit card before the screening result is available. For this case if it turns out that the screening result is positive then the merchant may not ship any goods that may have been purchased. In another embodiment, a credit or debit card is only charged if the screening result is negative. It is important to appreciate at least some, if not all of the operations described with reference to FIG. 4 of the drawings, may be implemented as business logic or rules executing on the client system 12.

Figure 5:
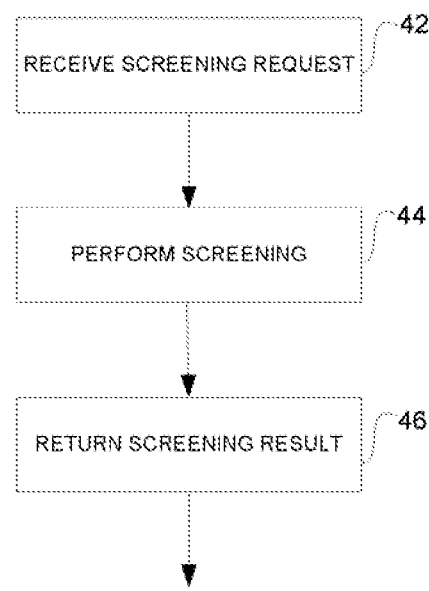
FIG. 5 shows a flowchart for a screening process performed by the server system of FIG. 3, in accordance with one embodiment of the invention.

FIG. 5 of the drawing shows a flowchart of operations performed by the server system 14, in accordance with one embodiment of the invention. As will be seen, at block 42, the server system 14 receives the screening request from the client system 12. The screening request is screen a candidate for example a purchaser or a job applicant. At block 44, the server system 14 performs a screening operation based on the request. In one embodiment, the screening operation may include initiating a telephone call to the candidate in order to collect a voice sample for the candidate. The telephone call may be initiated by a live operator or by an automated system. Advantageously, in one embodiment, a series of innocuous questions are posed to the candidate during the telephone call so that the candidate does not suspect that the actual purpose of the call is to collect a voice sample. In one embodiment, the questions may be designed to obtain the candidate's name, credit card number, social security number, etc. In one embodiment the telephone call may be initiated by the candidate. For example, in the case of the candidate being a job applicant, the candidate may be given a telephone number to call. For greater flexibility, in one embodiment screening requests are assigned a unique screening identifier (ID) to be used to identify screening requests made to the server system 14. By using the screening ID, telephone calls can be linked to the appropriate screening request. For example, if a call to a candidate fails for some reason, the screening ID may be provided to the candidate via the merchant so that the when the candidate calls to provide a voice sample, the server system 14 can link the call to a particular screening request based on the screening ID. Once a voice sample for the candidate is obtained, the voice sample is compared to voice signatures in the fraudster database 22. At block 46, the server system 14 returns a screening result to the client system 12, via the intermediate wide area network 16.

Figure 6:
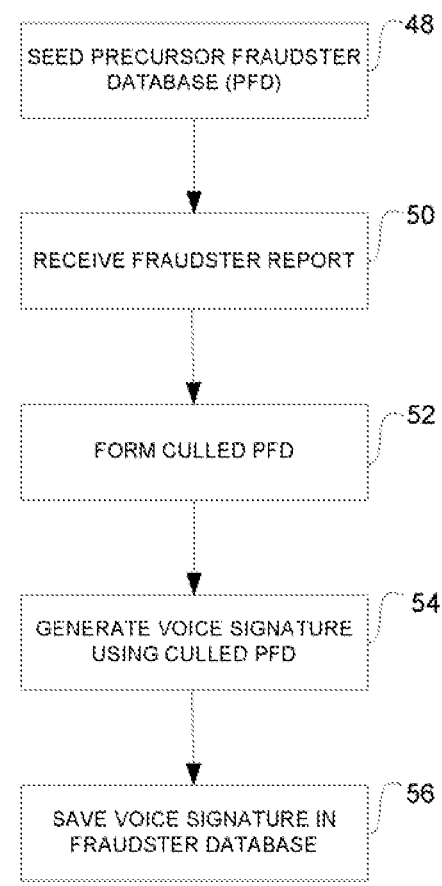
FIG. 6 shows a flowchart for an enrolment operation performed by the server system of FIG. 3 in accordance with one embodiment of the invention.
Figure 7:
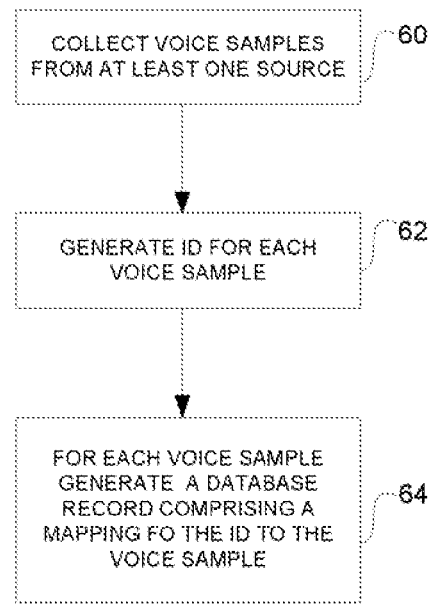
FIG. 7 shows a flowchart operations performed by the server system of FIG. 3 in order to seed a precursor fraudster database, in accordance with one embodiment of the invention.

In one embodiment, the enrolment engine 24 of the server system 14 performs an enrolment operation, as shown in the flowchart of FIG. 6. Turning to FIG. 6, the enrolment operation includes a block 48 where a precursor fraudster database (PFD) is seeded or populated. FIG. 7 of the drawings shows a flowchart of operations performed at block 48 to seed the precursor database in accordance with one embodiment of the invention. As will be seen, at block 60, voice samples from at least one source, for example a merchant or vendor, are collected. The voice samples are collected without regard as to whether they are fraudulent or not. In one embodiment, collecting the voice samples includes operations similar to the operations of block 44 described above where a call is initiated to the candidate or the candidate is asked to call. At block 62, a unique identifier (ID) is generated for each voice sample. The unique identifier (ID) may be generated using speech recognition techniques, human transcription, or by a combination of speech recognition techniques and human transcription. In one embodiment, the unique identifier (ID) may be a credit card number embedded in the voice sample. At block 64, a database record is generated for each voice sample. The database record comprises a mapping of the unique ID to the voice sample. It will be appreciated, that as a result of the seeding operation performed at block 48, the precursor fraudster database (PFD) will include a large number of voice samples, without any information as to which of these samples belong to fraudsters. Thus, one goal of the enrolment operation performed by the enrollment engine 24 is to form a subset of voice samples from the precursor fraudster database (PFD), wherein the subset only contains voice samples known to belong to fraudsters. For ease of reference, such a subset of voice samples will be referred to as the "culled precursor fraudster database (PFD)". Continuing with FIG. 6, at block 50, a fraudster report is received from a merchant. In one embodiment, the fraudster report may be received from the client system 12 via the wide area network 16. In essence, the fraudster report includes information, such as, for example, credit card numbers known to have been used fraudulently, or social security numbers associated with instances of fraud, etc. In one embodiment, the fraudster report is received periodically from the merchant.

Figure 8:
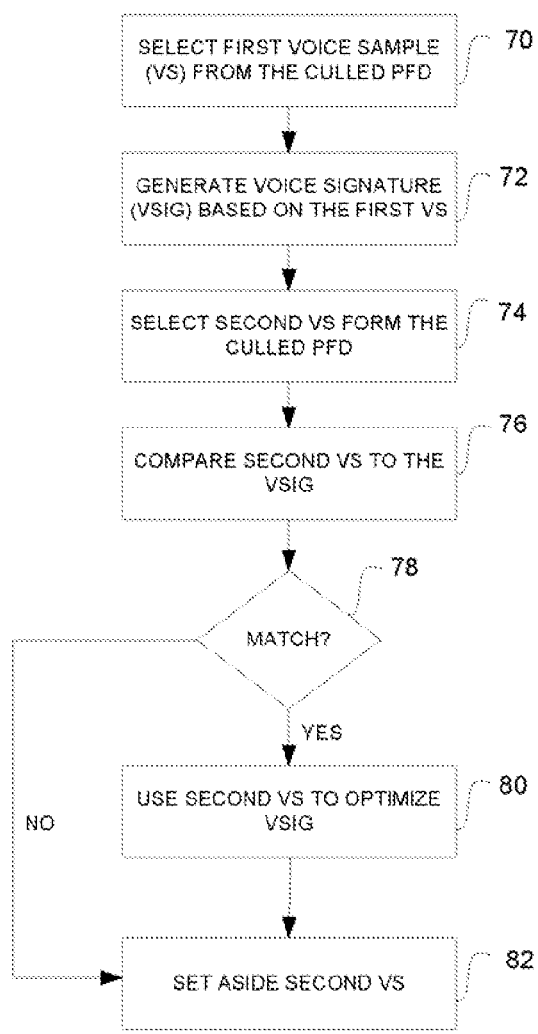
FIG. 8 shows a flowchart of operations performed by the server system of FIG. 3 in order to cull the precursor fraudster database, in accordance with one embodiment of the invention.

At block 52, the culled precursor fraudster database (PFD) is generated or formed. The particular operations performed in order to form the culled precursor database (PFD), in accordance with one embodiment, is shown in the flowchart of FIG. 8. As will be seen, at block 66 the enrollment engine 24 finds a subset of records in the precursor database (PFD) with matching information to that in the fraudster report. For example, consider the case where the voice samples in the precursor fraudster database (PFD) contains information relating to a credit card transaction. In this case the operations at block 66, include searching the precursor fraudster database (PFD) for those voice samples that include a credit card number that matches a credit card number appearing in the fraudster report.

At block 68, the subset of records determined at block 66, is further reduced by removing those records dated earlier than the fraudster report from the subset. The operation at block 68 is performed so that voice samples belonging to non-fraudsters do not form part of the subset or culled precursor database (PFD). By virtue of the operations performed in the flowchart of FIG. 8 it will be appreciated that the culled PFD includes only the voice samples of known fraudsters.

Figure 9:
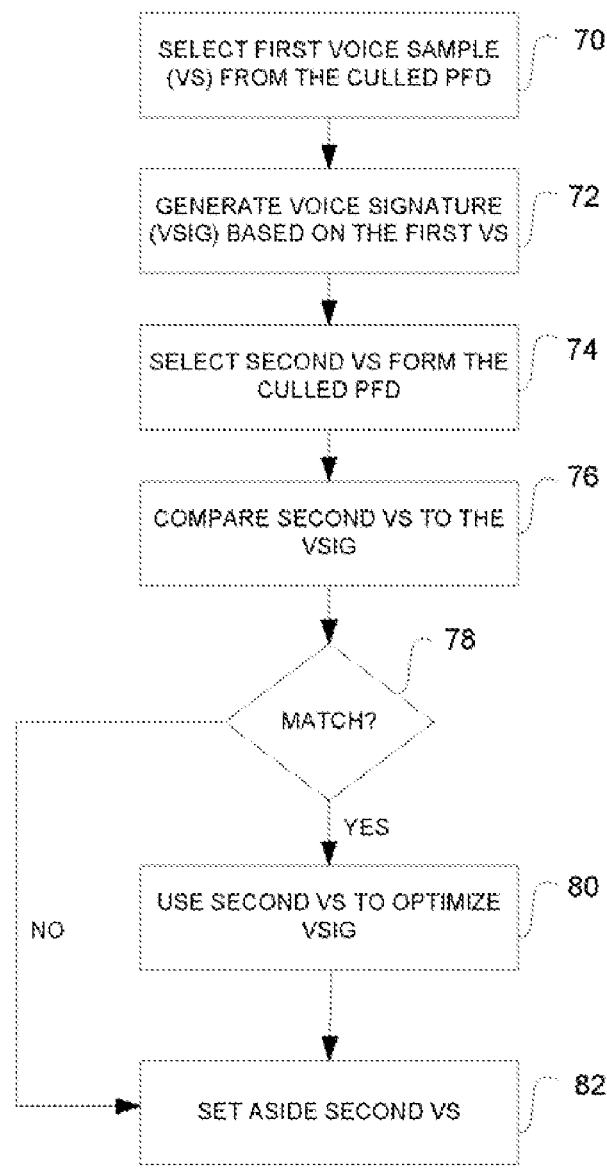
FIG. 9 shows a flowchart of operations performed by the server system of FIG. 3 in order generate a voice signature, in accordance with one embodiment of the invention.

Continuing with FIG. 6, at block 54, voice signatures are generated using the culled PFD. Turning now to FIG. 9 of the drawings, there is shown a flowchart of operations performed, in accordance with one embodiment of the invention, in order to generate the voice signatures at block 54. As will be seen, at block 70, a first voice sample (VS) from the culled PFD is selected. In one embodiment, this is a random selection. At block 72, using the voice processing engine 28, a voice signature (VSIG) based on the first voice sample is generated. At block 74, a second voice sample from the culled PFD is selected. Thereafter, at block 76, the second voice sample is compared to the voice signature (VSIG) that was generated based on the first voice signature.

At block 78, if the second voice sample matches the voice signature then control passes to block 80, otherwise control passes to block 82. At block 80; the second voice sample is used to train or optimize the voice signature. At block 82, the second voice sample is set aside, in other words it is not considered in the training of the voice signature. In one embodiment, the operations 70 to 82 are performed until a predefined number of fraudulent voice signatures are generated. In one embodiment, the voice samples that were set aside at block 82 are considered to form a separate subset and the operations 70 to 82 are performed on this separate subset. Thus, several voice signatures may emerge as a result of the repeated performance of the steps 70 to 82, of FIG. 9.

Continuing with FIG. 6 of the drawings, at block 56, the voice signatures that were generated as per the flowchart of FIG. 9 are saved in a fraudster database.

It will be appreciated that once the fraudster database 22 is constructed in accordance with the above described techniques, performing the screening operation at block 44 can be achieved by comparing against the voice signatures in the fraudster database in order to find a match, which would be indicative of a fraudster.

The foregoing described how the fraudster report may be used to disqualify a candidate attempting to complete a transaction such as a credit card transaction or purchase. It is to be appreciated that the techniques described herein may be used to disqualify candidates from other types of transaction such a, for example, a debit card transaction.

For the employment verification case the fraudster report is generated by an employer, who designates disqualified or undesirable candidates using a unique identifier for the candidate, such as for example, a social security number for the candidate. Candidates may become undesirable because of, for example, a failed background check or because they were fired.

Based on the foregoing, it will be appreciated that in accordance with different embodiments different types of fraud may be detected. Accordingly, the fraudster database may contain voiceprints of fraudsters who have committed identity theft, credit card theft, insurance fraud, mortgage fraud, employment identity misrepresentation, or any other form of fraud that can be detected and used to enroll fraudsters into the database. Based on the foregoing, it will be appreciated that the database could contain voiceprints of criminals or suspected criminals who have committed or are charged with certain specified types of crimes.

It is to be understood that quite apart from the applications for detecting fraud, employee misrepresentation, etc. described above, the techniques and systems of the present invention may be used to screen or qualify a person or candidate based on one or more predefined screening criteria. Voiceprint databases may then be constructed in accordance with the techniques described above against which screenings may be performed based on whether a voiceprint of a candidate matches a voiceprint in a database. For example, in one case a voiceprint database of persons accused of child abuse may be constructed, and screenings could be undertaken against this database as a condition of employment.

In some embodiments, screening against the voiceprint database may occur before the application for credit or service is approved, after approval but before the account or credit card is activated, or even after use of the account has commenced, or a combination of these.

In accordance with the nomenclature used herein, a "reporting entity" is the entity that provides the fraudster report. As described above, a reporting entity may be a merchant. In some cases a reporting entity may be a credit card or service account issuer who will report that a prior successful screening conducted has turned out to be an instance of identity theft, and so audio data from that particular screening is added to the voiceprint database.

Companies may be reluctant to report identity theft instances for enrollment into the fraudster database, since fraud occurrence information may be viewed as confidential and/or detrimental to consumer confidence. In one embodiment, to increase the number of fraudster reports received, victims of identity fraud may be incentivized to report instances of fraud. For example, in one embodiment a website is provided to enable consumers/victims to report instances of fraud. The victims need not enter any personal information on this website as account information for compromised accounts will be sufficient. Using this information the fraudster database can be updated in accordance with the techniques described above, since the audio data recorded during screening can be mapped to the account number screening is requested for.

Embodiments of the invention may be implemented either as a service over the web or as a system on the premises of the screening entity. In either case, the fraudster database may be a private database for a particular screening entity, or it may be shared among two or more screening entities In one embodiment, the fraudster voiceprint database is periodically sorted and updated with new data. Metrics such as the number of times each voiceprint is matched are collected, and the database is sorted to have frequently detected voiceprints at the head, so as to increase matching speed. Voiceprints that are not matched during a preselected time window may be removed from the database, thus making space for newly detected fraudster voiceprints to be stored in the database.

In one embodiment, the fraudster voiceprint database may be segmented in different ways to improve detection accuracy. Each segment forms a new database hereinafter referred to as the "segmented database". Segmented databases may be developed to suit the requirements of particular screening entities.

In one embodiment, the fraudster database may be segmented based on metadata. As used herein the term "metadata" refers broadly to any data that may be associated with a person and may includes a person's physical attributes, such as age or eye color and non-physical attributes such as a person's geographic location. Thus, in one embodiment, the database may be segmented based on metadata in the form of a location indicator such as a zip code of the person that is being screened, or on the area code of the phone number being screened on. In another embodiment, the fraudster database may be segmented based metadata in the form of industry-type—for example, a database exclusively for casinos to detect a particular kind of fraud endemic to casinos.

One technique for segmenting the fraudster database based on location information will now be described. In accordance with this techniques and as a first step, when the voiceprint database is formulated by enrolling a person's voiceprint into the database in response to an event of interest such as fraud location information associated with the event of interest is extracted and linked with the voiceprint. For example, if the event of interest occurs when a merchant reports that a stolen credit card was used to make a fraudulent purchase, then the address to which the goods were shipped is acquired and linked with the fraudster's voiceprint. Examples of location information include channel information such as an Internet Protocol (IP) address or Automatic Number Identification (ANI) or destination number information linked with a phone call. These elements are transformable into a geographic location using common techniques. Another possibility is noting the time of the event of interest, since time zones provide some degree of geographical information, and the time that the call is placed with or without other information can be used to determine the approximate time zone location the caller is in. Thus, for every entry in the voiceprint database, a linkage is made to one or more locations, each storing one or more geographical aspects. Examples of geographical aspects include zip code, geocodes, full addresses, longitude and latitude combinations, etc.

As a second step, to segmenting based on location, when presented with audio from an unknown person, location information associated with that person is acquired. Examples include a shipping address for a merchant, a mailing address for a credit card issuer, a store address for a retailer, residential address of an applicant, IP address, ANI information etc. The audio from the unknown person is compared against voiceprints in the voiceprint database where the location information associated with the voiceprint in the database is defined to be 'near' to the geographical information associated with the unknown person. Such 'nearness' may be defined in many ways. For example, location information can be transformed into a geocode and nearness defined to be a specific distance between the two sets of geographic information. Another definition may be searching voiceprints linked to a specific set of zip codes that are "near" the geographical information associated with the unknown person. Another definition may be searching voiceprints linked to subsets of the channel information that are proxies to location, such as area codes in an ANI or portions of an IP address.

In one embodiment, instead of comparing to voiceprints that are nearby, another method is to compare to all voiceprints in the database and then boost the screening scores for voiceprints near to the geographical information associated with unknown person.

In accordance with different embodiments of the invention, different techniques may be employed to perform the enrolment operation described with reference to FIG. 6 of the drawings. For example, in one embodiment, all audio can be enrolled into the screening database, and then voiceprints that are not detected after a period of time can be dropped. In another embodiment, a fresh new database can be constructed at regular intervals from audio data that is associated with fraud.

In one embodiment, techniques may be employed to make the fraud detection technique of the present invention resilient to circumvention efforts by determined fraudsters. As a method of circumvention, some fraudsters may record voices of other people saying required phrases which recordings are then played back in response to questions by the detection system. In one embodiment, this method of circumvention may be addressed by changing the order of questions at random or by inserting extra questions at random. Responses to these questions can be recognized using a speech recognizer to examine whether the responses were valid. In this way, it can be determined by the voice recordings are used to provide responses to the questions. Another method of circumvention involves the synthetic generation of voices using electronic or computer methods—e.g. using text-to-speech (TTS) systems or by using voice transformation systems. Each of these techniques can be fingerprinted because artificial systems will generate unique audio signatures that can be detected by advanced signal processing. By looking for these signatures, in one embodiment it can be detected if these methods are in use.

In one embodiment, instead of segmenting the database by a location indicator, the global or un-segmented voiceprint database may be used for screening, however in this case resultant scores may be boosted by location aspects. For example, in one embodiment, the system sets the score to negative for results not within a geographic area of interest.

In some cases, in order to circumvent the fraud detection system of the present invention, a fraudster may move or in some other way change the location he or she is associated with. For example, a fraudster may use an accomplice as a proxy for perpetrating the fraud by recruiting either a willing or unwitting accomplice at another address to effect the fraud for them. In such cases, the fraud detection system of the present invention will determine that there are multiple applications within a short time from the same address, and use that information in the screening process as an indicator of fraud. As another way of circumventing the fraud detection system of the present invention, a fraudster may move to a different location. In this case, the fraud detection system detects evasion based on the following steps:

(a) determine voiceprints that were active in a prior time period and in a particular location-segmented database (hereinafter the "home segment") that have gone inactive. An active voiceprint is one that has a certain threshold rate of being matched (hereinafter the "accept rate") within the particular location-segmented database. For example, the threshold rate may be set to be 5% of the total number of matches performed against a database. An inactive voiceprint is one that falls to a selected matching level below the threshold rate, e.g. 1%.

(b) For each voiceprint that has gone inactive, screen the voiceprint against all other location-segmented databases, to determine accept rates within each.

(c) If within any segment the accept rate is higher than that in the home segment, the audio that caused those accepts are examined by a human to rule out the false accepts.

(d) If the match is close enough, then the fraudster is deemed to have moved to a new geographic location and the home segment for that frauster is set to the segment would the higher accept rate. The fraudster may be then be removed from the prior home segment.

In accordance with the nomenclature used herein, "database seeding" refers to the process of populating the fraudster database with voice samples. In the United States, and in several other countres, recordings of legal proceedings are routinely maintained. In one embodiment of the invention, audio of criminals or defendants from these recordings is obtained and subsequently compiled into a voiceprint database containing these defendants' or criminals' voiceprints. Subsequently, audio acquired through, for example, a telephone can be compared against this database to determine if the audio belongs to a criminal within the database.

Seeding of the fraudster database using recordings obtained from the courts, may involve the following steps, in accordance with one embodiments 1. Legal case data is acquired from courts this can be current or historical.

2. The cases of interest are determined from this data. Cases of interest are those that were prosecuted for an illegal action that is of interest to consumers of the database. Examples of actions of interest (an incomplete list) are: identity theft, sex abuse, child neglect, irresponsible use of credit, theft, etc.

3. Audio is acquired for these cases of interest from court recordings. Of course, audio could be acquired for all cases, and then that audio could be filtered by the parameters in step [2]. This is simply a variation of this process.

4. Using human means or automated means, the audio belonging only to the prosecuted person is separated from the complete audio of the legal proceeding. This is important to preserve the integrity of the database.

5. This separated audio is then enrolled into a voiceprint database using software or hardware that converts audio to voiceprints.

6. Additional information about the prosecuted person is optionally linked in a computer database with the enrolled voiceprint. Such data may include but not be limited to, details of charges, details of conviction, data of conviction, criminal history, photographs, prior known addresses, physical descriptions such as height and appearance, etc.

An optional additional step that can also precede step [3] is to separate out data from convicted persons those persons who may have been released from prison, and use this set of people instead. The rationale here is that people released from prison are more likely to commit a new crime than those still in prison.

Figure 10:
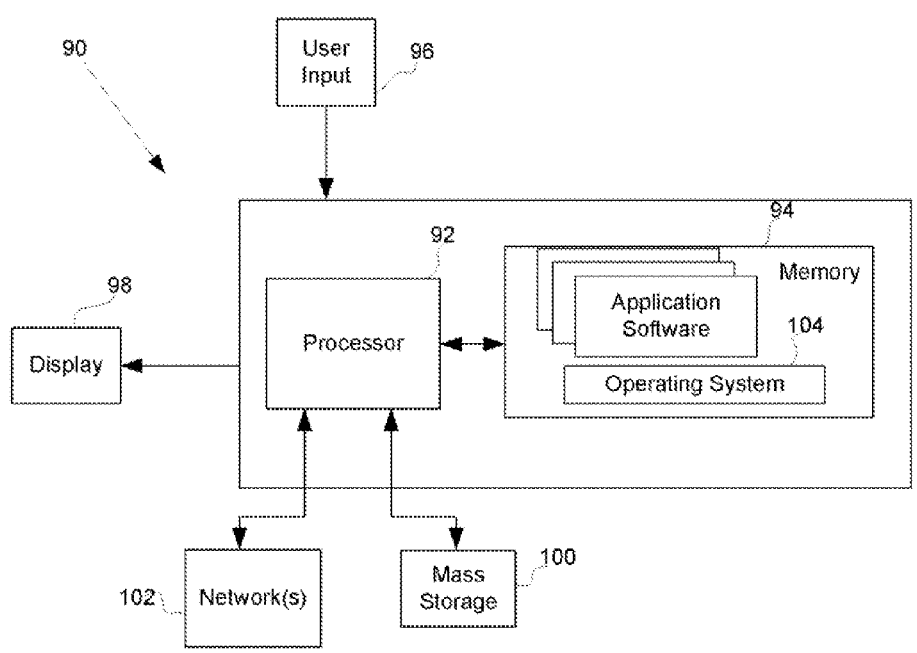
FIG. 10 shows an example of hardware that might by used to implement any of the client and server systems of the present invention.

The client system 12 and the server system 14 have, thus far, been described in terms of their respective functions. By way of example, each of the client and server systems of the present invention may be implemented using the hardware 90 of FIG. 10. The hardware 90 typically includes at least one processor 92 coupled to a memory 94. The processor 92 may represent one or more processors (e.g., microprocessors), and the memory 94 may represent random access memory (RAM) devices comprising a main storage of the system 90, as well as any supplemental levels of memory e.g., cache memories, non-volatile or back-up memories (e.g. programmable or flash memories), read-only memories, etc. In addition, the memory 94 may be considered to include memory storage physically located elsewhere in the system 90, e.g. any cache memory in the processor 92, as well as any storage capacity used as a virtual memory, e.g., as stored on a mass storage device 100.

The system 90 also typically receives a number of inputs and outputs for communicating information externally. For interface with a user or operator, the system 90 may include one or more user input devices 96 (e.g.; a keyboard, a mouse, etc.) and a display 98 (e.g., a Liquid Crystal Display (LCOD) panel).

For additional storage, the system 90 may also include one or more mass storage devices 100, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the system 90 may include an interface with one or more networks 102 (e.g., a local area network (LAN), a wide area network (WAN), a wireless network, and/or the Internet among others) to permit the communication of information with other computers coupled to the networks. It should be appreciated that the system 90 typically includes suitable analog and/or digital interfaces between the processor 92 and each of the components 94, 96, 98 and 102 as is well known in the art.

The system 90 operates under the control of an operating system 104, and executes various computer software applications, components, programs, objects, modules, etc. to perform the respective functions of the client and server systems of the present invention. Moreover, various applications, components, programs, objects, etc. may also execute on one or more processors in another computer coupled to the system 90 via a network 102, e.g. in a distributed computing environment, whereby the processing required to implement the functions of a computer program may be allocated to multiple computers over a network.

In general, the routines executed to implement the embodiments of the invention, may be implemented as part of an operating system or a specific applications component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

One advantage of the techniques and systems described herein is that fraud detection is base on a fraudster's voice, which being biometric in nature is linked to the fraudster. This is in contrast with techniques that use parametric information such, for example, lists of stolen credit cards to control fraud. It will be appreciated that the embodiments of the present invention will enable fraud detection even in cases where the theft or loss of a credit card had not been reported.

What is claimed is:

1. A computer-implemented method, comprising:
   (a) maintaining a database of known fraudsters, wherein each fraudster has a voice signature and metadata associated therewith;
   (b) segmenting the database into a plurality of segmented databases based on the metadata; and
   (c) performing a screening operation using a computer to match a candidate with a fraudster in the database based on matching a voice signature and metadata for the candidate with a voice signature and metadata for the fraudster in at least one segmented database, wherein each voice signature is assigned a home segmented database within which it has an accept rate, and for each voice that has gone inactive within its home segmented database, a search is carried out to determine if the voice signature is active within another segmented database.

2. The method of claim 1, wherein the metadata comprises location information associated with fraud.

3. The method of claim 1, wherein the matching is first performed based on the voiceprints; and thereafter the results of the matching are ranked based on matching of the metadata.

4. The method of claim 1, wherein the matching is biased to produce a match for multiple screening requests from a particular address with a predefined period.

5. The method of claim 1, wherein if the voice signature is determined to be active in the other segmented database, the other segmented database is set as the home segmented database for the voice signature.

6. The method of claim 5, wherein determining if the voice signature is active in the other segmented database comprises confirming the matching using human intervention.

7. A system, comprising:
   a processor; and
   a memory coupled to the processor, the memory storing instructions which when executed by the processor causes the system to perform a method comprising:
   (a) maintaining a database of known fraudsters, wherein each fraudster has a voice signature and metadata associated therewith;
   (b) segmenting the database into a plurality of segmented databases based on the metadata; and
   (c) performing a screening operation to match a candidate with a fraudster in the database based on matching a voice signature and metadata for the candidate with a voice signature and metadata for the fraudster in at least one segmented database, wherein each voice signature is assigned a home segmented database within which it has an accept rate, and for each voice that has gone inactive within its home segmented database, a search is carried out to determine if the voice signature is active within another segmented database.

8. The system of claim 7, wherein the segmenting is based on requirements of particular screening entities.

9. The system of claim 7, wherein the metadata comprises location information associated with fraud.

10. The system of claim 7 wherein the matching is first performed based on the voiceprints; and thereafter the results of the matching are ranked based on matching of the metadata.

11. The system of claim 7, wherein the matching is biased to produce a match for multiple screening requests from a particular address with a predefined period.

12. The system of claim 7, wherein if the voice signature is determined to be active in the other segmented database, the other segmented database is set as the home segmented database for the voice signature.

13. The system of claim 12, wherein determining if the voice signature is active in the other segmented database comprises confirming the matching using human intervention.

14. The method of claim 1, wherein the segmenting is based on requirements of particular screening entities.

* * * * *